F. A. COURTOIS.
APPARATUS FOR DETERMINING SPECIFIC GRAVITY.
APPLICATION FILED NOV. 16, 1907.
907,107.
Patented Dec. 15, 1908.
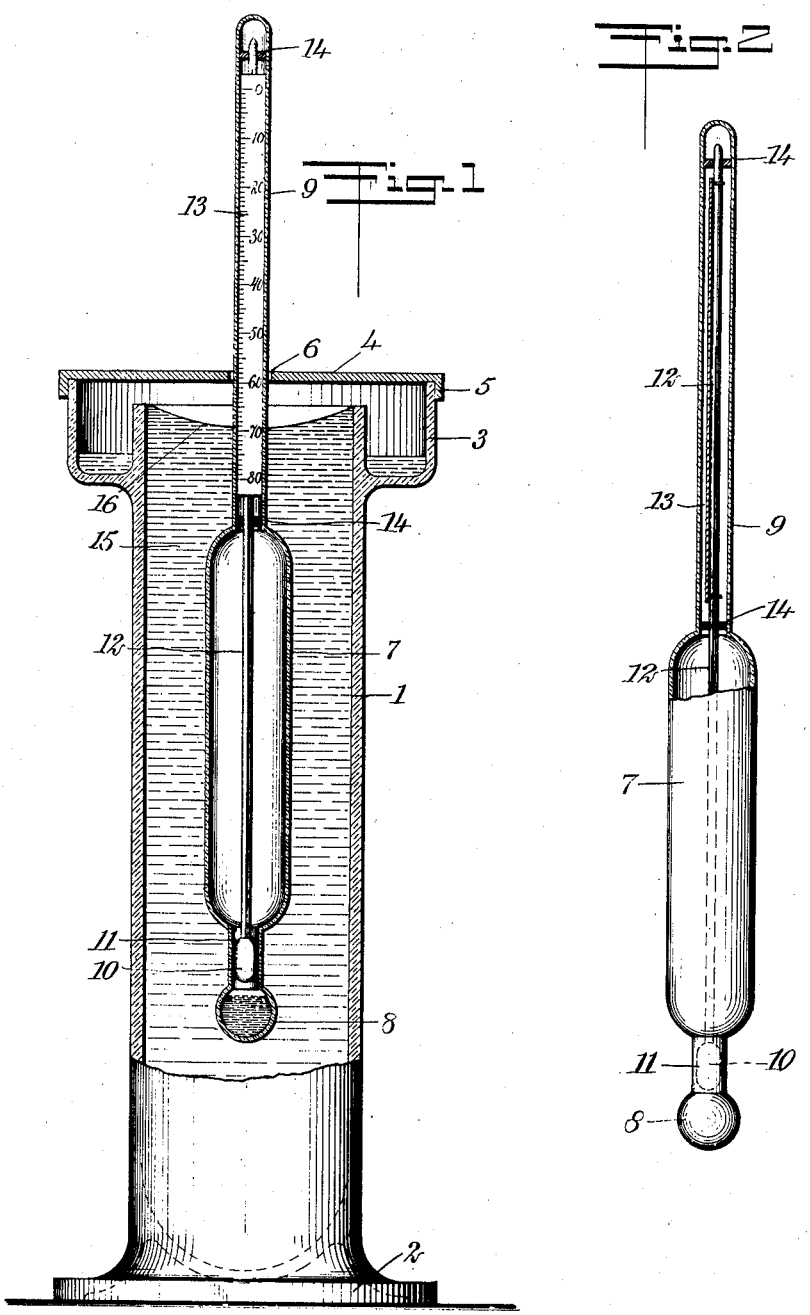
WITNESSES
INVENTOR
Fernand A. Courtois
BY
ATTORNEYS

UNITED STATES PATENT OFFICE.

FERNAND A. COURTOIS, OF NEW YORK, N. Y.

APPARATUS FOR DETERMINING SPECIFIC GRAVITY.

No. 907,107.  Specification of Letters Patent.  Patented Dec. 15, 1908.

Application filed November 16, 1907. Serial No. 402,438.

*To all whom it may concern:*

Be it known that I, FERNAND A. COURTOIS, a citizen of the Republic of France, and a resident of the city of New York, borough of Manhattan, in the county and State of New York, have invented a new and Improved Apparatus for Determining Specific Gravity, of which the following is a full, clear, and exact description.

This invention relates to apparatus for determining specific gravity, and is particularly useful in connection with hydrometers, for ascertaining the densities of liquids.

An object of the invention is to provide a simple and inexpensive apparatus for determining specific gravities, particularly of liquids, which obviates the difficulties often encountered in obtaining the hydrometer readings, owing to the presence of the meniscus of the liquid under investigation.

A further object of the invention is to provide an apparatus of the class described, which is used in combination with an ordinary hydrometer, which has means for maintaining the liquid undergoing examination, at a constant level, and which is provided with fixed means adapted to coact with the hydrometer, to permit the accurate reading of the hydrometer scale.

The invention consists in the construction and combination of parts to be more fully described hereinafter, and particularly set forth in the claims.

Reference is to be had to the accompanying drawings forming a part of this specification, in which similar characters of reference indicate corresponding parts in both views, and in which—

Figure 1 is a partial longitudinal section of the device showing the same in use in combination with a liquid under investigation, and of a hydrometer; and Fig. 2 is a partial longitudinal section of the hydrometer.

Before proceeding to a more detailed explanation of my invention, it should be understood that it can be used with hydrometers of different types, though I prefer to employ in connection therewith a hydrometer of the form shown in the accompanying drawings, which consists of the float, the ballast bulb, and the stem carrying the hydrometer scale. The hydrometer is also shown with a thermometer, by means of which the temperature of the liquid under examination can be ascertained, and which is necessary for many purposes in testing and experimental operations. The meniscus of a liquid is almost always a source of inaccuracy and annoyance in determining the density of the liquid. It is well known, that the meniscus, which may be concave or convex, according to the nature of the liquid, causes a distortion of the liquid surface. The hydrometers commonly used have the scale graduated to read at the surface of the liquid, and consequently, the distortion of the liquid surface, due to the meniscus, renders the reading of the scale problematical in many instances.

In my invention, the hydrometer scale is specially graduated and is read not at the surface of the liquid but at a fixed point thereabove, provided by a movable cover which is normally mounted upon the receptacle which holds the liquid being tested. I provide means for maintaining the surface of the liquid constant with respect to the cover, so that the readings of the hydrometer scale can always be obtained with absolute accuracy.

Referring more particularly to the drawings, 1 represents a vessel adapted to receive the liquid to be tested, and fashioned from any suitable material, such as glass, metal, porcelain or the like. The vessel 1 is preferably cylindrical in form and has a base 2, to insure the stability of the vessel. The upper rim of the latter is preferably annular in form, and lies in a plane substantially at right angles to the longitudinal axis of the vessel. Surrounding the upper rim of the latter is an annular overflow receptacle 3, preferably formed integral with the vessel and having the rim projecting beyond the rim of the vessel. A cover 4, having a laterally-disposed, peripheral retaining flange 5, is removably mounted upon the rim of the overflow receptacle, and has the flange 5 engaging at the outer side of the receptacle to hold the cover firmly in position. The latter has a substantially central opening 6, for a purpose which will appear hereinafter. In the accompanying drawings is shown the form of the hydrometer which I prefer to use in connection with my invention. This hydrometer comprises a float bulb 7, below the same a ballasting bulb 8, and integral with the float bulb a stem 9. The hydrometer is formed of any suitable material, preferably glass, and is provided with ballast in the bulb 8 which insures the floating of the hydrometer in the position shown in Fig. 1. A thermometer is arranged within the hydrometer and has the bulb 10, arranged within the constricted neck 11, between the float bulb 7 and the ballast bulb 8, so that the liquid within which the hydrometer floats is substantially in contact with the thermometer bulb. The thermometer tube 12, extends longitudinally of the hydrometer into the stem 9. The hydrometer scale 13 is arranged preferably within the stem 9, and as shown in Fig. 2 may, for instance, be suitably mounted upon the thermometer tube. The thermometer graduations are marked upon the latter in the usual manner. When the thermometer and hydrometer scales are within the stem 9, the latter must of course, be of transparent material to permit the reading of the scales without difficulty. The thermometer tube 12 can be held in position within the stem 9 by means of blocks or collars 14, arranged within the stem and provided with openings to receive the thermometer tube.

When it is desired to use my apparatus, the vessel 1 is filled nearly to the top with the liquid 15, which is to be investigated. The hydrometer is then inserted in the liquid and displaces a sufficient quantity of the liquid to cause the same to overflow into the receptacle 3. Thus, under the circumstances, the overflow of the liquid serves to maintain the level constant and at the rim of the vessel. The liquid 15 at the upper surface forms a meniscus, for instance, as shown in the drawings, a concave meniscus 16. The cover 4 is arranged upon the rim of the vessel 3 with the stem 9 of the hydrometer projecting through the opening 6. The scale 13 is graduated to read not at the surface of the liquid, but at the upper face of the cover 4. Consequently the meniscus offers no obstruction to the reading of the scale.

Having thus described my invention, I claim as new, and desire to secure by Letters Patent:

1. A device of the class described, comprising a vessel having an overflow receptacle at the top thereof, said overflow receptacle having a rim extending above the upper rim of said vessel, and a cover removably arranged upon said overflow receptacle above said vessel, and being adapted to co-act with the hydrometer to permit the accurate reading of the scale thereof.

2. A device of the class described, comprising a vessel having an overflow receptacle surrounding the upper rim thereof, and a cover removably arranged over said vessel, said cover being adapted to coact with a hydrometer to permit the accurate reading of the scale thereof.

3. A device of the class described, comprising a vessel having an overflow receptacle surrounding the upper rim thereof, the rim of said overflow receptacle extending beyond the upper rim of said vessel, and a cover removably arranged upon the rim of said receptacle, said cover having an opening to permit the projection therethrough of the hydrometer stem, and being adapted to co-act with the hydrometer to permit the accurate reading of the hydrometer scale at the cover.

4. The combination, with a hydrometer having a stem carrying a hydrometer scale and a thermometer scale, of a vessel having an overflow receptacle surrounding the upper rim thereof, the rim of said receptacle extending beyond the upper rim of said vessel, and a cover removably mounted upon said rim of said receptacle and having an opening therethrough adapted to permit the projection through said opening of said hydrometer stem, said hydrometer scale being calibrated to read at the upper face of said cover.

In testimony whereof I have signed my name to this specification in the presence of two subscribing witnesses.

FERNAND A. COURTOIS.

Witnesses:
 GEO. C. FIELD,
 LEWIS S. HOYT.